United States Patent [19]

Baron et al.

[11] Patent Number: 4,624,395
[45] Date of Patent: Nov. 25, 1986

[54] HOT BEVERAGE DISPENSING MACHINE

[75] Inventors: Richard D. Baron, Zephyrhills; Michael H. Jones, Clearwater; David E. Kent, Palm Harbor, all of Fla.

[73] Assignee: Lykes Pasco Packing Co., Zephyrhills, Fla.

[21] Appl. No.: 609,240

[22] Filed: May 11, 1984

[51] Int. Cl.$^4$ .................. B67D 5/56; B67D 5/62; E21B 33/00; F25B 21/02
[52] U.S. Cl. .................. 222/129.1; 222/129.3; 222/146.1; 222/145; 222/501; 222/504; 222/641; 277/184; 277/206 A; 62/3
[58] Field of Search .................. 222/504, 129.1, 129.4, 222/129.3, 640, 641, 162, 181, 146.1, 146.5, 146.6, 501, 65, 66, 54, 145, 58; 141/351, 353, 356, 291, 296; 251/339, 331; 137/392; 62/397, 3; 277/206 A, 206, 206.1, 206 R, 184, 185, 180

[56] References Cited

U.S. PATENT DOCUMENTS

| | | | |
|---|---|---|---|
| Re. 24,332 | 6/1957 | Svenson | 277/206.1 |
| 792,621 | 6/1905 | Schlueter . | |
| 1,513,935 | 11/1925 | Schatz . | |
| 1,571,795 | 2/1926 | Poss . | |
| 1,833,150 | 11/1931 | Beechlyn . | |
| 1,916,807 | 7/1933 | Neumann . | |
| 1,972,962 | 9/1934 | Weber . | |
| 2,161,321 | 6/1939 | Smith | 62/397 X |
| 2,254,833 | 9/1941 | Ashkenaz . | |
| 2,526,735 | 10/1950 | Duce . | |
| 2,534,254 | 12/1950 | Felber . | |
| 2,551,842 | 5/1951 | Kirchner . | |
| 2,682,984 | 7/1954 | Melikian et al. | 222/1291 X |
| 2,887,255 | 5/1959 | Bauerlein . | |
| 2,928,253 | 3/1960 | Lopp et al. | 62/3 |
| 2,953,171 | 9/1960 | Arnett . | |
| 2,957,607 | 10/1960 | Smith . | |
| 2,979,231 | 4/1961 | Witherspoon, Jr. . | |
| 3,001,557 | 9/1961 | Kuckens . | |
| 3,011,426 | 12/1961 | Mueller . | |
| 3,033,422 | 5/1962 | Totten . | |
| 3,045,869 | 7/1962 | Rodth et al. | 222/54 X |
| 3,045,870 | 7/1962 | Danziger . | |
| 3,054,533 | 9/1962 | Kurek . | |
| 3,064,859 | 11/1962 | Petrusek . | |
| 3,084,613 | 4/1963 | Maxson . | |
| 3,088,289 | 5/1963 | Alex . | |
| 3,100,585 | 8/1963 | Nail . | |
| 3,140,012 | 7/1964 | Hansen . | |
| 3,159,190 | 12/1964 | Skiera . | |
| 3,165,299 | 1/1965 | Balamuth . | |
| 3,167,925 | 2/1965 | Elfving | 62/3 |
| 3,168,292 | 2/1965 | Joschko . | |
| 3,181,574 | 5/1965 | Lenkey . | |
| 3,181,732 | 5/1965 | Immermann . | |

(List continued on next page.)

Primary Examiner—Joseph J. Rolla
Assistant Examiner—Gregory L. Hudson
Attorney, Agent, or Firm—Frijouf, Rust & Pyle

[57] ABSTRACT

A hot beverage dispensing machine is disclosed for dispensing a beverage from a concentrate. The dispensing machine includes a beverage concentrate container disposed in an inverted orientation within a refrigerated compartment. A first valve is associated with the container, the first valve permitting the flow of the concentrate from the container when the container is located within the refrigerated compartment in an inverted position. A receptacle having a receptacle output removably receives the inverted container. A first electrically controlled valve regulates the flow of the concentrate via the receptacle output to a mixer wherein the concentrate is mixed with hot water from a hot water tank. A second electrically controlled valve regulates the flow of hot water from the water tank to the mixer. A dispenser spout is disposed in fluid communication with the mixer with the spout being disposed remote from the hot water inlet. A thermoelectric heat pump is located in thermal contact with the refrigerated compartment to maintain the compartment below ambient temperature. A combination of thermistors and water level sensors disposed within the water tank generate electrical signals to control flow of cold water into the tank and the hot water from the tank. A novel electrical circuit is also incorporated into the invention for controlling the various functions in the machine.

30 Claims, 33 Drawing Figures

U.S. PATENT DOCUMENTS

| | | |
|---|---|---|
| 3,193,143 | 7/1965 | Maieli . |
| 3,200,992 | 8/1965 | Maxwell . |
| 3,207,190 | 9/1965 | Silbereis . |
| 3,207,373 | 9/1965 | Dannenmann . |
| 3,218,175 | 11/1965 | Siegel . |
| 3,225,549 | 12/1965 | Elfving ................................ 62/3 |
| 3,241,719 | 3/1966 | Schmaus . |
| 3,248,009 | 4/1966 | Sutton . |
| 3,250,433 | 5/1966 | Christine . |
| 3,258,166 | 6/1966 | Kuckens . |
| 3,266,670 | 8/1966 | Brooks . |
| 3,273,752 | 9/1966 | Horeczky . |
| 3,301,486 | 1/1967 | Brock . |
| 3,314,242 | 4/1967 | Lefferts . |
| 3,323,681 | 6/1967 | Di Vette . |
| 3,324,667 | 6/1967 | Muller . |
| 3,343,721 | 9/1967 | Paley . |
| 3,345,934 | 10/1967 | Steiner . |
| 3,366,277 | 1/1968 | Barber . |
| 3,378,170 | 4/1968 | Reynolds . |
| 3,379,344 | 4/1968 | Cornelius . |
| 3,382,897 | 5/1968 | Skiera . |
| 3,384,268 | 5/1968 | Egee . |
| 3,388,833 | 6/1968 | Cornelius . |
| 3,406,753 | 10/1968 | Habdas . |
| 3,444,892 | 5/1969 | Doyle . |
| 3,445,039 | 5/1969 | Brodsky . |
| 3,474,632 | 10/1969 | Newton . |
| 3,487,782 | 1/1970 | Henrotte . |
| 3,500,751 | 3/1970 | Robertson . |
| 3,529,749 | 9/1970 | Lehmann . |
| 3,532,505 | 10/1970 | Cornelius . |
| 3,540,402 | 11/1970 | Kocher . |
| 3,578,209 | 5/1971 | Fraser . |
| 3,580,425 | 5/1971 | DeMan . |
| 3,584,763 | 6/1971 | Donselman . |
| 3,589,559 | 6/1971 | Cotton . |
| 3,590,857 | 6/1971 | Gruett . |
| 3,606,096 | 9/1971 | Campbell . |
| 3,625,402 | 12/1971 | Kulls . |
| 3,635,037 | 1/1972 | Hubert . |
| 3,656,507 | 4/1972 | Martinez . |
| 3,668,479 | 6/1972 | Weston . |
| 3,669,312 | 6/1972 | Kuckens . |
| 3,765,568 | 10/1973 | Leifermann . |
| 3,782,429 | 1/1974 | Barber ........................ 222/66 X |
| 3,794,219 | 2/1974 | Pitel . |
| 3,804,635 | 4/1974 | Weber . |
| 3,812,890 | 5/1974 | Haas . |
| 3,843,020 | 10/1974 | Bardeau et al. ............ 222/145 X |
| 3,858,569 | 1/1975 | Berger . |
| 3,991,219 | 11/1976 | Kuckens . |
| 3,991,911 | 11/1976 | Shannon . |
| 3,995,770 | 12/1976 | Schwitters . |
| 4,000,396 | 12/1976 | Abel, Jr. . |
| 4,002,268 | 1/1977 | McKinney . |
| 4,008,832 | 2/1977 | Rodth . |
| 4,015,749 | 4/1977 | Arzberger . |
| 4,055,279 | 10/1977 | Lapera et al. ..................... 222/54 |
| 4,068,781 | 1/1978 | Toth . |
| 4,076,146 | 2/1978 | Lausberg . |
| 4,096,971 | 6/1978 | Kuckens . |
| 4,109,829 | 8/1978 | Kuckens et al. ............ 222/442 X |
| 4,111,337 | 9/1978 | Lerner . |
| 4,124,146 | 11/1978 | Sealfon . |
| 4,133,354 | 1/1979 | Lerner et al. . |
| 4,140,104 | 2/1979 | Itagaki . |
| 4,140,140 | 2/1979 | Proia . |
| 4,169,978 | 10/1979 | Hauslein . |
| 4,182,363 | 1/1980 | Fuller ............................. 137/392 |
| 4,331,338 | 5/1982 | Caldwell et al. ............ 277/184 X |
| 4,450,987 | 5/1984 | Boettcher et al. .............. 222/641 |
| 4,475,738 | 10/1984 | Eicher et al. .................... 277/206 |

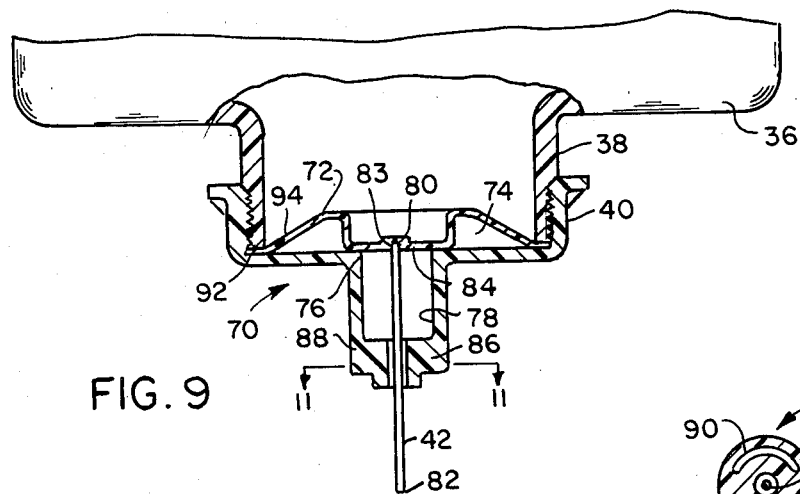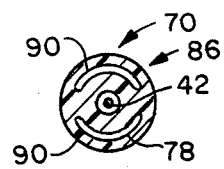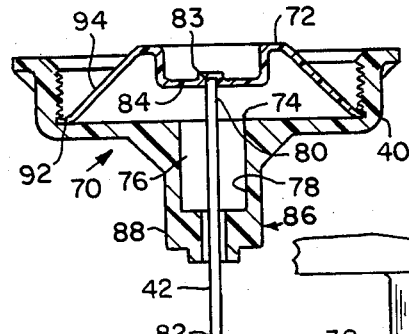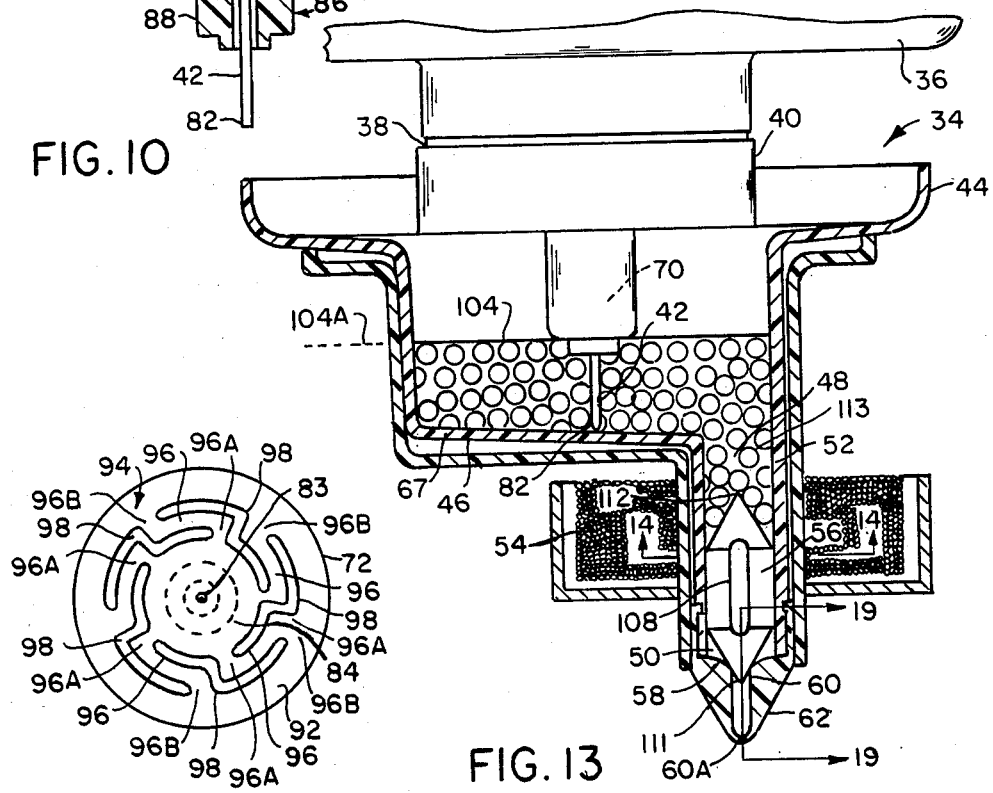

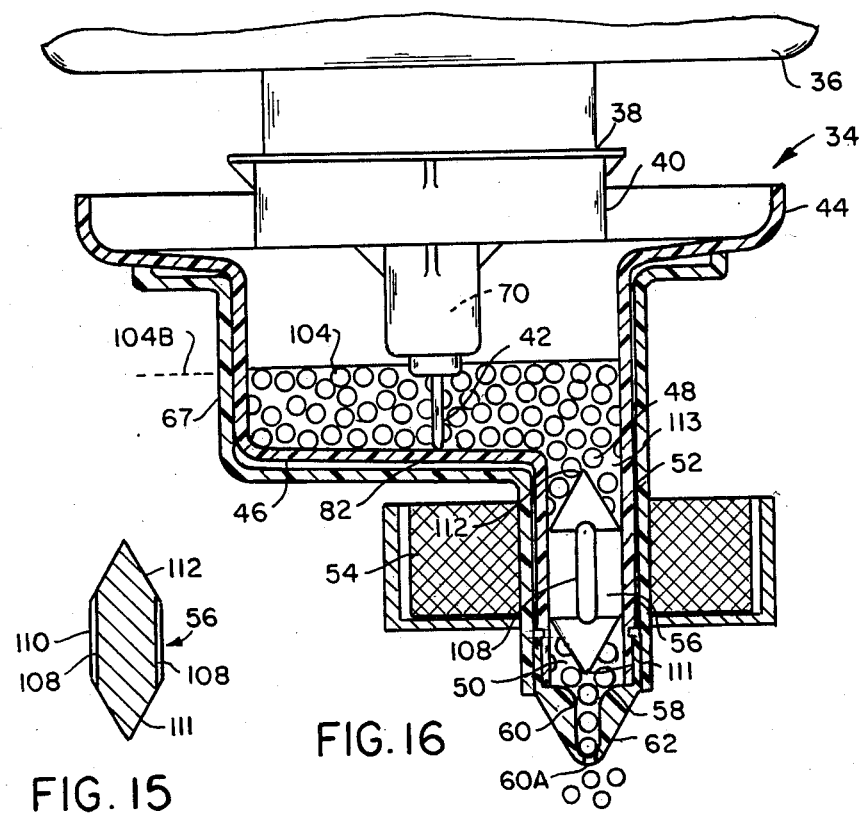
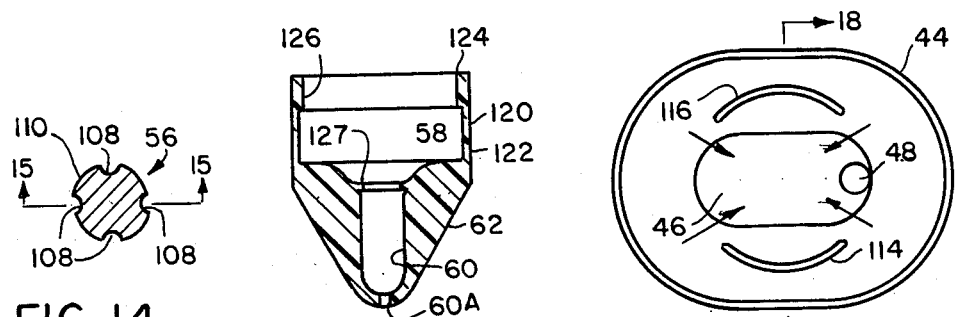
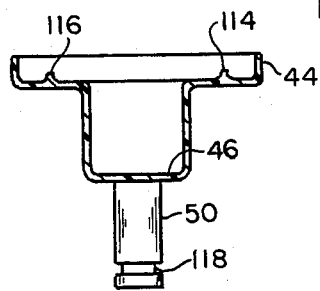
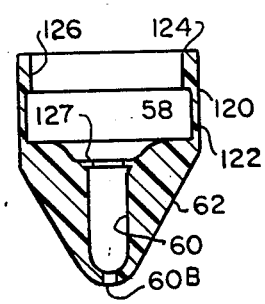

HOT BEVERAGE DISPENSING MACHINE

BACKGROUND OF THE INVENTION

1. Field of the Invention

This invention relates to dispensing machines, and more specifically, the invention relates to hot beverage dispensing machines and the like.

2. Information Disclosure Statement

Traditionally, coffee has been brewed utilizing a wide variety of coffee percolating devices. Unlike hot tea, ground blended coffee beans must be infused with hot water that is maintained at a temperature just below the boiling point of water. Usually, the preparation of a cup of hot coffee involves depositing a carefully measured quantity of freshly ground coffee beans into a cup shaped filter located within a support container. Water maintained at a temperature of between 195°–207° F. is slowly introduced into the container and the coffee perfusion is separated by gravity and the filter through apertures in the container into a coffee pot or the like disposed below the container.

Numerous modifications to this basic method of brewing coffee have been proposed including various syphoning arrangements and pumps for forcing the perfusion through the filter. However, in more recent years, a trend has developed with regard to hot beverage brewing machines utilizing coffee concentrates rather than freshly ground beans.

The advantages to the use of coffee concentrates are primarily the uniformity with which such concentrates may be prepared. Coffee beans vary in quality and the taste of the resultant coffee depends not only on the quality of the coffee beans but also the manner in which such beans are prepared, roasted and stored. With coffee concentrates, quality control is more easily maintained.

Moreover, in view of the large quantities of coffee consumed each day, the preparation of freshly brewed coffee throughout the day not only proves a time consuming chore, but also a costly one.

In addition, the quality of a cup of coffee depends to a large degree on the freshness of the brewed coffee, the quality degrading in accordance with the time lapse from the initial brewing of the coffee to the time of consumption.

Dispensing machines have been proposed utilizing coffee concentrates. Most of the prior art dispensers dispense a measured quantity of concentrate into a cup and then add hot water to the concentrate.

U.S. Pat. No. 2,928,253 to Lopp et al describes a thermo-electric heating and cooling arrangement which may be for hot water or food. However, no disclosure is made regarding coffee blenders.

U.S. Pat. No. 3,001,557 to Kuckens teaches a concentrate container having a pressure equalizing vent tube for permitting a constant flow of concentrate from the container.

U.S. Pat. No. 3,323,681 to Di Vette discloses a compressible tube type pump for positively pumping concentrate from a concentrate container to a mixing chamber.

U.S. Pat. No. 3,991,219 to Kuckens teaches a method of mixing carbonated beverage by mixing carbon dioxide and water with a syrup.

U.S. Pat. No. 4,096,971 to Kuckens relates to a dispensing system including a pump and a one way valve for measuring a required portion of concentrate.

U.S. Pat. No. 4,133,354 to Lerner et al relates to a coffee brewer having a gravity flow hot water reservoir.

U.S. Pat. No. 3,258,166 to Dagma teaches an inverted concentrate container in which the flow of concentrate from the container is controlled by an electromagnetically operated valve. The container incorporates a pressure equalizing tube therein for allowing the flow of concentrate therefrom. In practice, equalizing tube complicates the manufacture of the container and necessitates the sealing of the container prior to shipping.

The hot beverage dispensing machine of the present invention overcomes the inadequacies of the prior art machines by providing a beverage dispensing machine that provides a freshly brewed beverage of superior taste characteristics. The dispenser of the present invention also includes a concentrate container of conventional construction that requires no integral venting arrangement.

Therefore, it is the primary objective of the present invention to provide a hot beverage dispensing machine that overcomes the aforementioned inadequacies of the prior art machines and provides an improvement which significantly contributes to the quality of the resultant beverage and the ease with which such dispensing machine may be operated to dispense hot coffee or the like.

Another object of the present invention is the provision of a hot beverage dispensing machine in which a conventional concentrate container without a pressure equalizing vent tube is located adjacent a first valve which controls the flow of concentrate therethrough.

Another object of the present invention is the provision of a hot beverage dispensing machine in which a first valve includes a flexible diaphragm having a central closure which cooperates with a valve seat defined by a cap, the cap cooperating with the concentrate container.

Another object of the present invention is the provision of a hot beverage dispensing machine in which a flexible diaphragm is secured between a cap and a cooperating threaded neck of the concentrate container, including an intermittent annular web being disposed between a central closure and a periphery of the flexible diaphragm. The annular web receives a first valve actuator which moves axially through a passageway defined by the cap to lift the closure from the valve seat, when the end of the actuator is pressed against the base of a receptacle to flow concentrate into the receptacle.

Another object of the present invention is the provision of a hot beverage dispensing machine having a receptacle outlet which defines a conduit, the first end of which is disposed adjacent the base of the receptacle and the opposite end includes a first electrically operated valve for controlling the flow of concentrate therethrough.

Another object of the present invention is the provision of a hot beverage dispensing machine having a solenoid coil which encircles the conduit, the coil cooperating with a metallic solenoid core disposed within the conduit with the solenoid core having a conical end which cooperates with a valve seat defined by a resilient tip secured to the second end of the conduit for controlling the flow of concentrate in accordance with an electrical signal to the solenoid.

Another object of the present invention is the provision of a hot beverage dispensing machine including a mixer which receives concentrate from the receptacle output, the mixer including a hot water inlet and a dispenser spout disposed remote from the water inlet for insuring complete dispensing of the concentrate.

Another objective of the present invention is the provision of a hot beverage dispensing machine have a refrigerated compartment for receiving the concentrate container incorporating a Peltier-type thermo-electric device disposed adjacent the refrigerated compartment to maintain the temperature within the compartment below the ambient temperature.

Another object of the present invention is the provision of a novel seal between the Peltier-type thermo-electric device and the refrigerated compartment.

Another object of the present invention is the provision of a hot beverage dispensing machine in which an electrically controlled fan draws a a current of air at ambient temperature through the thermo-electric device, and thereafter dividing the air to pass over the various components of the machine to prevent condensation thereon.

Another object of the present invention is the provision of a hot beverage dispensing machine with a water heater tank including an electric immersion heater for maintaining the temperature of the water contained therein within specified parameters determined by electrical signals received from a combination of water level sensors and thermistors disposed within the tank.

Another object of the present invention is the provision of a hot beverage dispensing machine with the water heater tank including a cold water supply port at a first level, an outlet port at a second level, the second level being higher than the first level and a plurality of water level sensor devices disposed within the water tank to control the flow of cold water into the tank.

Another object of the present invention is the provision of a hot beverage dispensing machine wherein the water is maintained in the water heater tank in a stratified temperature state, thus insuring that only hot water of proper temperature is directed to the mixer to mix with the concentrate.

Another object of the present invention is the provision of a hot beverage dispensing machine wherein the concentrate and the hot water both flow by action of gravity and are each established to have a substantially constant head pressure.

Another object of this invention is the provision of a hot beverage dispensing machine wherein the concentrate and the hot water flow in unison upon activation of a mechanical switch enabling the dispensing of a hot beverage of a preselected concentration irrespective of the volume of the hot beverage dispensed by the machine.

Another object of the present invention is the provision of a novel electrical control apparatus for controlling the electrical functions of the hot beverage dispensing machine.

The foregoing has outlined some of the more pertinent objects of the present invention. These objects should be construed to be merely illustrative of some of the more pertinent features and applications of the invention. Many other beneficial results can be attained by applying the disclosed invention in a different manner or modifying the invention within the scope of the disclosure. Particularly, with regard to the use of the invention described herein, this should not be construed to be limited to coffee dispensing machines, but should include any hot beverage dispensing machine or the like.

SUMMARY OF THE INVENTION

The hot beverage dispensing machine of the present invention is defined by the appended claims with a specific embodiment shown in the attached drawings. For the purpose of summarizing the invention, the invention relates to a hot beverage dispensing machine or the like. The hot beverage dispensing machine includes a beverage concentrate container disposed within a refrigerated compartment of the machine. A first valve associated with the container permits the flow of concentrate from the container when the container is located in an inverted position within the refrigerated compartment. A receptacle having a receptacle outlet includes a first electrically operated valve for controlling the flow of concentrate through the receptacle output into a mixer. A second electrically controlled valve regulates the flow of hot water to the mixer to effect mixing of the concentrate and the hot water for dispensing from a dispenser spout in fluid communication with the mixer.

In one aspect of the invention, the first valve includes in combination a cap which threadably cooperates with a neck portion of the container. The cap defines a passageway and a valve seat is disclosed adjacent a first end of the passageway. A flexible perforate diaphragm is secured adjacent the periphery thereof between the container and the cap. The flexible diaphragm includes a closure which is integral with the diaphragm, the closure cooperating with the valve seat to seal the container. A valve actuator extends through the passageway enabling the closure to be lifted from the valve seat upon axial movement of the valve actuator relative the passageway. To permit flow of concentrate from the container to the passageway, the flexible diaphragm further includes an annular web which extends between the periphery and the closure of the diaphragm. The annular web consists of a plurality of segments, each of which has a first and a second end. The first end of each segment is connected to the closure and the second end of each segment is connected to the periphery such that adjacent segments define therebetween a perforation of substantially Z-shaped configuration. The valve actuator is preferably a rod having a first and a second end. The first end of the rod is secured to the closure and the second end of the rod cooperates with the base of the receptacle to slidingly move the rod axially relative the container when the container is placed in the receptacle in an inverted position.

The base of the receptacle slopes downwardly towards the receptacle output. A conduit is defined by the receptacle output and extends from the base of the receptacle to a valve seat. The valve seat is disposed at one end of a bore defined by a resilient conical tip having an upstanding resilient skirt secured to the second end of the conduit. A solenoid coil encircles the conduit enabling a metallic solenoid core disposed within the conduit to move axially relative the valve seat in response to energization of the coil. The solenoid core includes a cylindrical portion having opposed ends of conical configuration with one of the conical ends cooperating with the valve seat to inhibit the flow of concentrate through the bore.

In another aspect of the present invention, the water heater tank includes an electric immersion heater and a cold water supply port in fluid communication with the water heater tank, the supply port being disposed at a first level. A hot water outlet port is disposed in fluid communication with the water heater tank at a second level which is higher relative the first level. A lower and an upper water level sensor device are disposed within the tank at a third and fourth level, respectively, the fourth level being higher than the third level and the third level being higher than the second level. A first and a second thermistor are disposed within the tank at a fifth and a sixth level, respectively, the fifth level being lower than the second level and the sixth level being lower than the fifth level and the sixth level being higher relative the first level. The immersion heater is energized in response to electrical signals received from the thermistors to provide a stratafication of water level temperatures internal the water heater tank. Flow of cold water from the inlet port is controlled by a third electrically controlled valve which is energized to permit flow in response to electrical signals received from the water level sensors. Dispensing of concentrate from the receptacle and dispensing of hot water from the tank is controlled by a manually operated switch.

In a further aspect of the present invention, the refrigerated compartment includes an air circulatory system for directing a flow of air past a thermo-electric cooling device. The thermo-electric device is preferably a Peltier heat pump, or thermo-electric cooler. The cooling effect of the thermo-electric device is utilized to maintain the temperature within the refrigerated compartment below ambient temperature. An electrically driven fan draws a first current of air at ambient temperature past the thermoelectric device. The first current of air is divided after passage through the thermo-electric device, to pass the water heater tank and an electronic control to prevent the accumulation of condensation internal the machine. A novel seal couples the thermoelectric device to the refrigerated compartment.

The invention incorporates a gravity flow of concentrate and a gravity flow hot water with each of the concentrate and the hot water emanating from a substantially constant head pressure.

The foregoing has outlined rather broadly the more pertinent and important features of the present invention in order that the detailed description of the invention that follows may be better understood so that the present contribution to the art can be more fully appreciated. Additionally, features of the invention will be disclosed or described hereinafter which form the subject of the claims of the invention. It should be appreciated by those skilled in the art that the conception and the specific embodiment disclosed may be readily utilized as a basis for modifying or designing other devices for carrying out the same purposes of the same invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following description taken in conjunction with the accompanying drawings in which:

FIG. 9 is an enlarged sectional view of a portion of FIG. 7 showing the first valve in a closed position to inhibit the flow of concentrate from the container;

FIG. 10 is a similar view to that shown in FIG. 9 but on a reduced scale and showing the first valve in the open position to permit flow of concentrate from the container;

FIG. 11 is a sectional view taken on the line 11—11 of FIG. 9;

FIG. 12 is a plan view of a flexible perforate diaphragm of FIG. 9;

FIG. 13 is an enlarged view of a portion of the dispenser shown in FIG. 7 showing the receptacle filled with concentrate and the first electronically operated valve closed to inhibit flow of concentrate through the receptacle output;

FIG. 14 is an enlarged sectional view of the solenoid core along line 14—14 of FIG. 13;

FIG. 15 is a sectional view along line 15—15 of FIG. 14;

FIG. 16 is similar to the view of the dispenser shown in FIG. 13 but shows the first electronically operated valve open to permit flow of concentrate;

FIG. 17 is a top plan view of the receptacle shown in FIG. 13;

FIG. 18 is a sectional view of the receptacle taken on the line 18—18 of FIG. 17;

FIG. 19 is an enlarged sectional view of a resilient conical tip taken on the line 19—19 of FIG. 13;

FIG. 20 is an enlarged sectional view of the resilient conical tip which is a variation of the tip shown in FIG. 19;

Similar reference characters refer to similar parts throughout the several views of the drawings.

DETAILED DESCRIPTION

Figure 1:
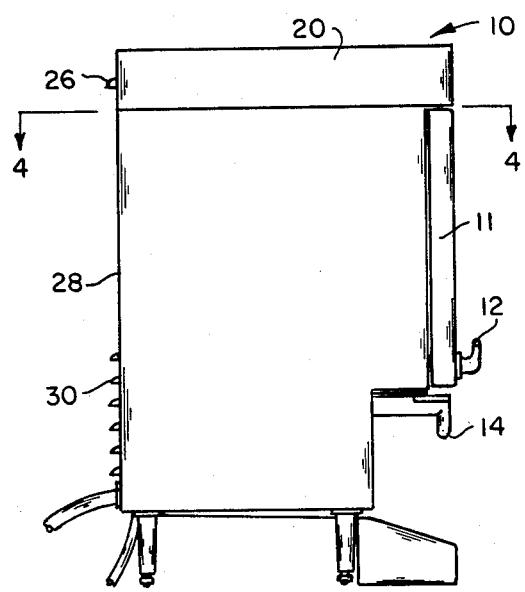
FIG. 1 is a side elevational view of the hot beverage dispensing machine according to the present invention.
Figure 2:
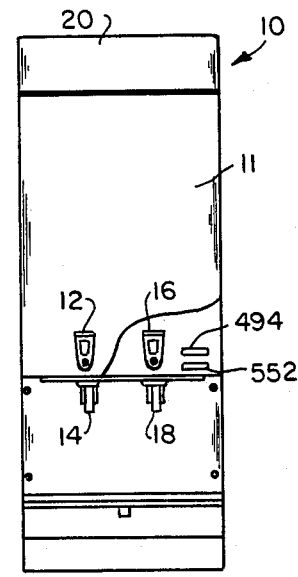
FIG. 2 is a front elevational view of the dispensing machine of FIG. 1.
Figure 3:
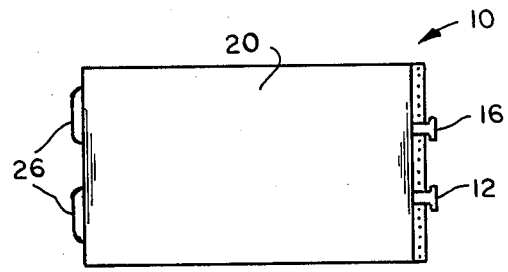
FIG. 3 is a top plan view of the dispensing machine of FIG. 1.
Figure 4:
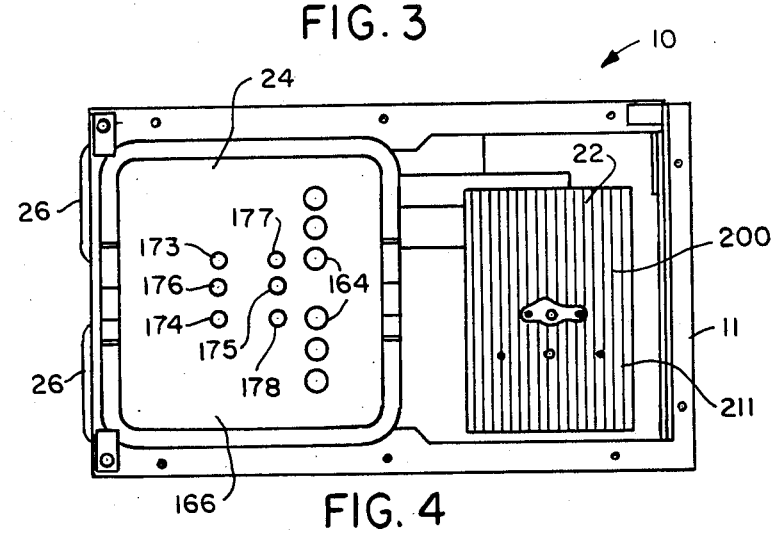
FIG. 4 is an enlarged sectional view taken on the line 4—4 of FIG. 1.
Figures 5, 6:
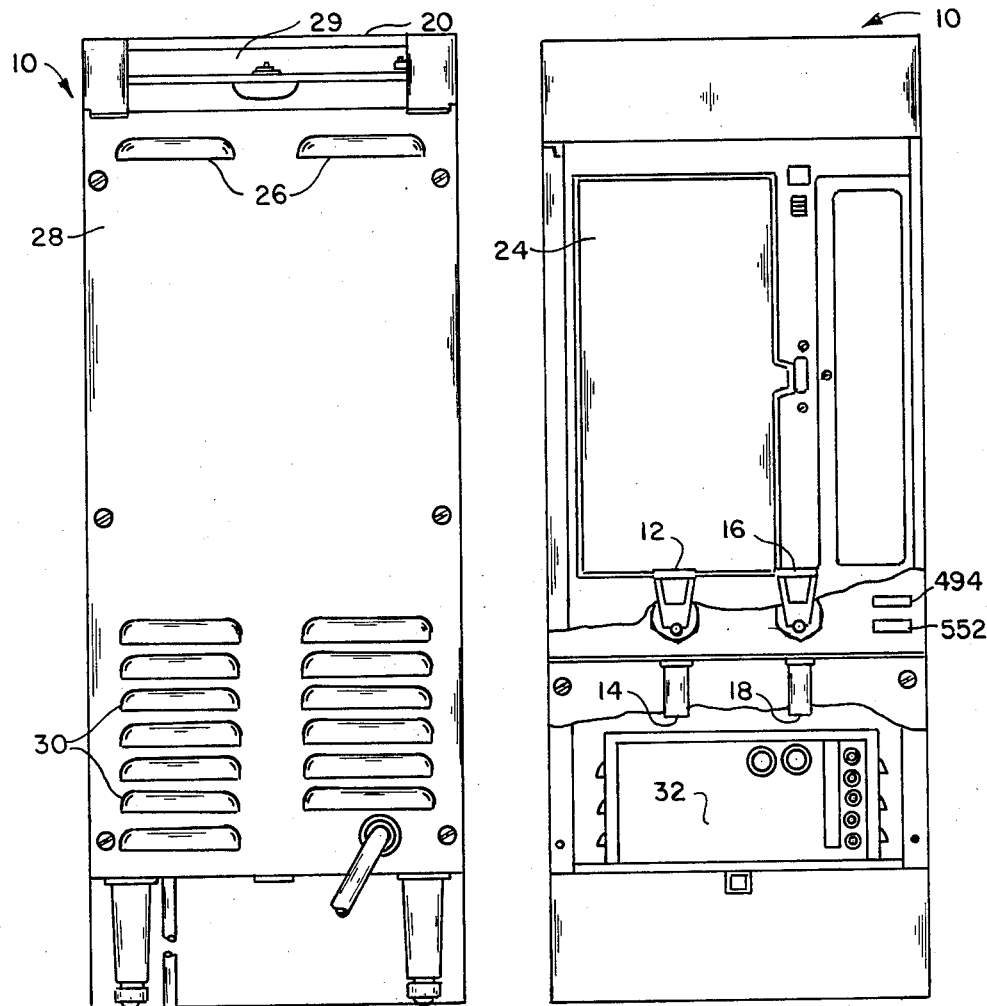
FIG. 5 is an enlarged rear elevational view of the dispensing machine of FIG. 1.
FIG. 6 is a front elevational view partially in section of the dispensing machine.

FIG. 1 is a side elevational view of a hot beverage dispensing machine generally designated 10 having a front access door 11. A manually controlled switch generally designated 12 initiates the dispensing of a hot beverage from the dispenser spout 14. FIG. 2 is a front elevational view of the dispensing machine 10 showing the manually controlled switch 12 and a second manually controlled switch 16 initiating the dispensing of hot water without a beverage mixed therewith through a second dispenser spout 18. FIG. 3 is a top plan view of the dispensing machine having a top cover 20. FIG. 4 is a top plan view of the dispensing machine 10 with the top cover 20 removed to expose a thermo-electric cooling system generally designated 22 and a water heating tank generally designated 24. FIG. 5 is a rear elevational view of the dispensing machine 10 showing top louvre means 26 defined by a rear cover 28, an air input opening 29 and and bottom louvre means 30. FIG. 6 is a front elevational view of the dispenser machine 10 partially in section to show an electrical control generally designated 32 for controlling the function of the machine 10.

Hot Beverage Dispensing Mechanism

Figures 7, 8:
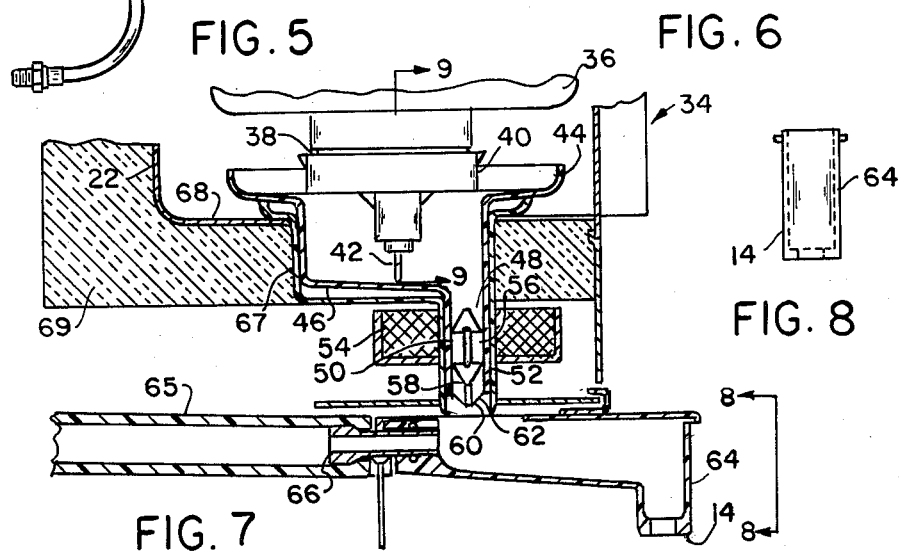
FIG. 7 is a cross sectional view of the dispensing mechanism of the present invention.
FIG. 8 is a view along line 8—8 in FIG. 7.

FIG. 7 is a sectional view of the dispensing mechanism generally designated 34 and includes a plastic concentrate container 36 having a threaded neck portion 38 which cooperates with an internally threaded plastic cap 40. A first valve actuator generally designated 42 extends through a passageway defined by the cap 40.

The cap 40 is removably received within a transparent plastic receptacle generally designated 44 having a sloping base 46. The sloping base 46 defines an orifice 48 and a receptacle output generally designated 50 which extends downwardly from the orifice 48. The receptacle output 50 defines a conduit 52 which is encircled by a solenoid coil 54. A metallic solenoid core 56 moves axially within the conduit 52 and cooperates with a valve seat 58 defined by the end of a bore 60 of a conical resilient tip 62 to provide a first electrically operated control valve for controlling the flow of concentrate from the bore 60 into an open topped mixer 64. Hot water from the water heater tank 24 flows through tube 65 to a hot water inlet generally designated 66 of mixer 64. The dispenser spout 14 is disposed at an end of the mixer 64 remote from the hot water inlet 66 for insuring that all concentrate is dispensed from spout 14. The receptacle 44 is disposed on a transparent plastic support 67 disposed on a metallic refrigeration compartment 68 encircled by insulation 69.

FIG. 8 is a partial front view showing the open topped mixer 64.

FIG. 9 is a sectional view of the concentrate container 36 and associated first valve generally designated 70. The concentrate is placed in concentrate container 36 and the internally threaded cap 40 including first valve 70 is screwed onto the neck 38 of the container 36. The first valve 70 includes a flexible perforate diaphragm generally designated 72 which cooperates with a valve seat 74 defined by the first end 76 of a passageway generally designated 78 extending through the cap 40. The first valve actuator 42 includes a first and a second end 80 and 82, respectively with the first end 80 of the first valve actuator 42 being received within an aperture 83 in a central first valve closure 84 which is formed integrally with the diaphragm 72. A spider network 86 shown more fully in FIG. 11 is disposed at the second end 88 of the passageway 78 to slidingly support the actuator 42 and to provide apertures 90 to enhance the flow of concentrate through passageway 78. Axial movement of the actuator 42 relative to the passageway 78 lifts the closure 84 from the first valve seat 74 permitting the flow of concentrate through an opening defined by the threaded neck portion 38 of the container 36 to the passageway 78, to discharge through aperatures 90 as shown in FIG. 10.

The flexible perforate diaphragm 72 is shown more particularly with reference to FIG. 12 and includes in addition to the central first closure 84, a periphery 92 which is secured between the threaded neck portion 38 of the container 36 and the cap 40. The diaphragm 72 further includes a web generally designated 94 which is disposed between the closure 84 and the periphery 92. The web 94 includes a plurality of segments 96, with each of the segments 96 having a first and a second end 96A and 96B, respectively. The first ends 96A of the segments are connected integrally with the first closure 84 and the second ends 96B of the segments are connected to the periphery 92 such that each adjacent segment defines therebetween a perforation 98 of substantially Z-shaped configuration.

When the actuator 42 moves axially towards the closure 84 shown in FIG. 10, the closure 84 not only is lifted from the first valve seat 74 but is also partially rotated relative the axis of the actuator 42 by action of the web 94. The partial rotation of the closure 84 assists in aiding the flow of concentrate through the plurality of Z-shaped perforations 98 and avoids the need of a relatively complex vent tube assembly to maintain flow of concentrate from the container.

When the concentrate container 36 is removed from the receptacle 44, the first closure 84 cooperates with the first valve seat 74 to inhibit flow of concentrate therethrough. However, when the container 36 is inverted and located on the receptacle 44, the first valve actuator 42 is moved axially by the base 46 of the receptacle 44 to permit flow of concentrate through the first valve 70. In addition, the concentrate flows from the container 36 into the receptacle 44 such that a constant head pressure is maintained within the receptacle 44, as will be described hereinafter.

FIG. 13 shows the receptacle 44 filled with concentrate 104 as the sloping base 46 cooperates with the second end 82 of the actuator 42 to move actuator 42 to open the first valve 70 allowing the flow of concentrate into the receptacle 44.

The solenoid core 56 is shown in more detail in FIGS. 14 and 15 cooperates with the second valve seat 58 defined by the conical resilient tip 62 to inhibit flow of concentrate from the end of a bore 60 defined by the tip 62. The solenoid core 56 includes plural grooves 108 for enhancing the flow of concentrate when the core 56 is displaced from the second valve seat 58 as shown in FIG. 16. The solenoid core 56 includes a cylindrical portion 110 and two conical ends 111 and 112, respectively, extending from opposite ends of the cylindrical portion 110. The longitudinal grooves 108 extend between the conical ends 111 and 112.

The grooves 108 permit the concentrate 104 to flow past the solenoid core 56 through the conduit 52 when the coil 54 is energized to move the solenoid core 56 axially relative the receptacle output 50, as shown in FIG. 16. The solenoid core 56 is preferably teflon coated magnetic stainless steel. An annular projection 113 in conduit 52 limits the upward movement of solenoid core 56.

When the solenoid core 56 is in the closed position as shown in FIG. 13, the level of the concentrate 104 in the receptacle 44 is at a static level 104A. The level of the concentrate 104 within receptacle 44 increases until the concentrate 104 covers apertures 90 of the spider network 86. Under the present invention, the level of the concentrate 104 never exceeds the static level 104A.

FIG. 16 shows the solenoid core 56 being displaced from the position shown in FIG. 13 by energizing of the solenoid coil 54 from the electrical control 32. The conical end 111 is displaced from valve seat 58 to allow concentrate to flow through bore 60. When the solenoid core 56 is in the open position as shown in FIG. 16, the level of the concentrate 104 in the receptacle 44 is at a dynamic level 104B. The dynamic level 104B is slightly lower than the static level 104A, enabling air to enter through apertures 90 in the spider 86 from the space adjacent cap 40 as shown by the arrows. Since there is only a slight difference in height between the static level 104A and the dynamic level 104B, the level of the concentrate 104 is essentially constant to provide a constant head pressure to the bore 60.

FIG. 17 is a top plan view of the receptacle 44 showing integral diametrically opposed abutments 114 and 116, respectively, which removably receive and position the cap 40. Air entering the container 36 through apertures 90 eminate from the region between abutments 114 and 116 is shown by the arrows. Preferably the receptacle is made of a one-piece transparent plastic assembly to enable optical measurement of the level of concentrate 104 therein.

FIG. 18 is a sectional view taken on the line 18—18 of FIG. 17 and shows the receptacle output 50 and the abutments 114 and 116. An annular groove 118 is defined in receptacle output 50 for receiving the tip 62 thereon.

FIG. 19 is an enlarged sectional view of the tip 62 taken on the line 19—19 of FIG. 13. An annular shaped resilient skirt 120 extends from a cylindrical edge 122. The distal end 124 of the skirt 120 is slightly thicker relative the rest of the skirt 120 to provide a bead 126 which cooperates with the annular groove 118 defined by the lower edge of the receptacle output 50. The tip 62 is preferably made of a rubber material. The tip 62 also includes a projection 127 of thin rubber material for cooperation with the end 111 of solenoid core 56. The projection 127 cooperates with valve seat 58 to insure a fluid tight seal when the solenoid core 56 is in the position as shown in FIG. 13.

The tip 62 includes a metering orifice 60A having a precision diameter for accurately dispensing a precise amount of concentrate into the mixer 64. Since the concentrate 104 is at an essentially constant level within receptacle 44, the metering orifice 60A will deliver a precise amount of concentrate per unit time of movement of solenoid core 56.

FIG. 20 is a second embodiment of a tip 62A having a metering orifice 60B. Metering orifice 60B is larger than metering orifice 60A to provide a greater flow of concentrate per unit time of opening of solenoid core 56. Preferably, several tips of different metering orifices are supplied with the machine 10 for adjusting the strength of the final coffee dispensed by the machine 10.

Figure 21:
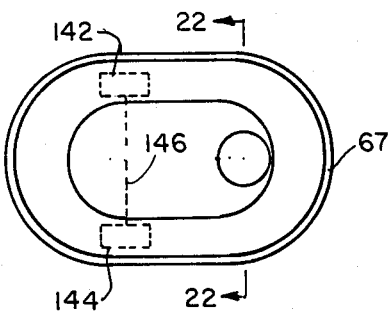
FIG. 21 is a top view of a support for the receptacle shown in FIGS. 17 and 18.
Figure 22:
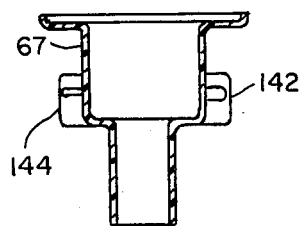
FIG. 22 is a sectional view along line 22—22 of FIG. 21.
Figure 23:
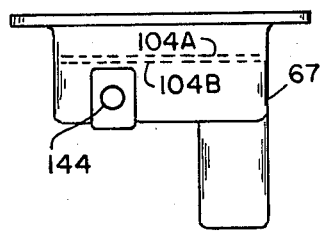
FIG. 23 is a side view of the support shown in FIG. 21.
Figure 30:
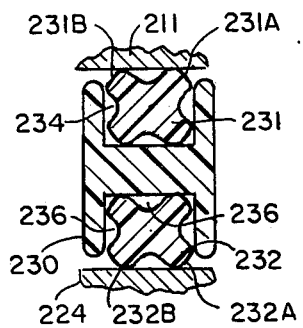
FIG. 30 is an enlarged sectional view of the sealing means shown in FIG. 28.

FIGS. 21, 22 and 23 shows various views of the support 67 for receiving the receptacle 44 therein as shown more fully in FIGS. 7, 13 and 16. The support 67 is preferably made of a transparent plastic material and is configured to slidingly receive the receptacle 44 therein. The support 67 is permanently mounted to the refrigeration compartment 22 as shown in FIG. 7 and allows easy removal of the receptacle 44 for cleaning and the like. The support 67 includes a light source 142 and a photoelectric detector 144 connected to the electrical control 32 for detecting the level of concentrate within the receptacle, along line 146. The light source 142 and detector 144 are located below the dynamic concentrate level 104B as shown in FIG. 23. Since most concentrates, such as coffee or tea, are opaque liquids, light from light source 142 is inhibited from passing through the concentrate in the receptacle and impinging upon the detector 144 when the concentrate 104 is at the dynamic level 104B. If the concentrate is depleted from the container 36, then the concentrate will fall below level 104B in the receptacle, and light from the light source 142 will be received by the detector 144 and the electronic control 32 will terminate operation of the dispensing machine as will be hereinafter described.

The quantity of concentrate that flows through the bore 60 is dependant upon three factors: first, the head pressure of the concentrate within the receptacle; second, the time that the solenoid core 56 is lifted from the cooperating valve seat 58; and third, the diameter of the metering orifice 60A or 60B. With regard to these three factors, the head pressure of the concentrate within the receptacle 44 is constant by design of the receptacle. Therefore, in order to vary the quantity of the concentrate 104 which flows through the bore 60, either the time that the solenoid core 56 is lifted from valve seat 58 may be varied electrically or the diameter of the metering orifice of the conical resilient tip 62 may be changed by the operator. The final strength of the coffee dispensed from the machine 10 is also dependent upon the flow rate of the hot water and the period of time the hot water flows into the mixer 64.

In the present invention, the concentrate and the hot water was always dispensed in unison, and with both the concentrate and hot water emanating from a substantially constant head pressure. Accordingly, the end beverage product emanating from the mixer 64 will always be of a preselected concentration irrespective of the amount of volume of beverage dispensed by the machine. For example, under the present invention if a one-half cup of coffee is desired the concentrate and hot water will each flow in unison for a period of time necessary to fill a one-half cup container. Alternatively, if a carafe is desired, the concentrate and hot water will each flow in unison for a period of time necessary to fill a carafe container. In either case, the beverage dispensed will be of the same concentration, since the concentrate and the hot water are both flowing in unison and during the same period of time. Many of the prior art machines varied the concentration of the end product by varying the time of flow of the concentrate relative to the time the hot water would flow. Accordingly, the prior art machines were incapable of dispensing a one-half, a one-third or a one-quarter cup due to the relative time differences between the flow of concentrate and the flow of hot water.

The present machine overcomes these disadvantages by ensuring that the concentrate and the hot water both flow in unison and during the same period of time. The concentration of the final beverage dispensed is varied by altering the metering orifice 60A or 60B and/or by varying the flow rate of the hot water through a metering valve as will be discussed in more detail hereinafter.

Water Heater Tank

Figure 24:
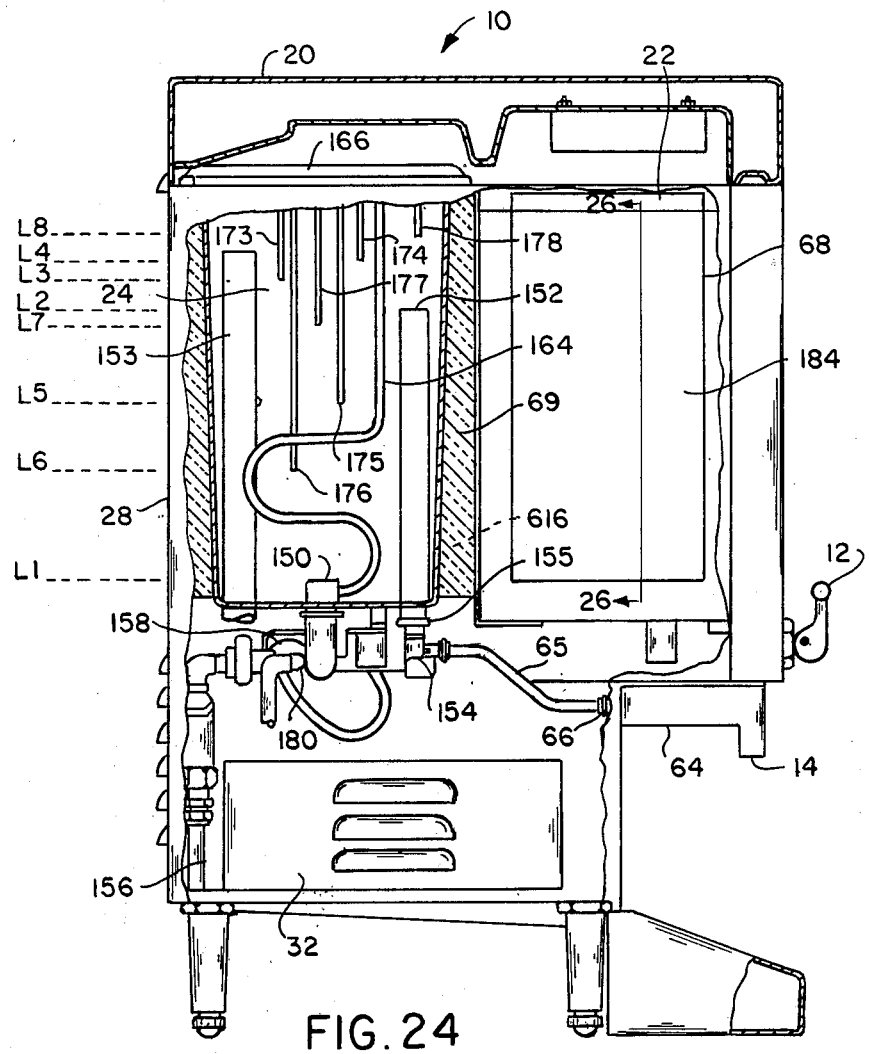
FIG. 24 is an enlarged side elevational view partially in section showing the internal mechanism of the dispenser.
Figure 25:
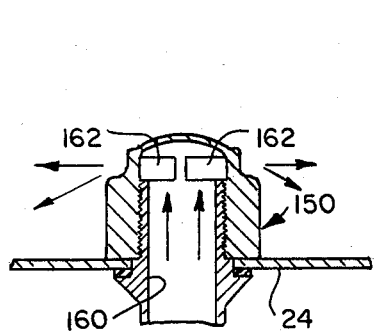
FIG. 25 is an enlarged sectional view of a cold water inlet of the water heater tank of FIG. 24.

FIG. 24 shows the water heater tank 24 including a cold water supply port 150 and a hot water outlet port 152 and an overflow port 153. A second electrically operated valve 154 interconnects the hot water outlet port 152 with the tube 65 connected to the hot water inlet 66 of mixer 64. A metering valve 155 may be set to vary the flow rate of hot water to inlet 66 upon actuation of the second electrically operated valve 154. An input cold water conduit 156 is connected through a third electrically operated valve 158 to the supply port 150. The supply port 150 includes a conduit 160 in fluid communication with apertures 162 disposed on the side surface of the supply port as shown more fully in FIG. 25. The apertures 162 on the side surface direct the cold water entering the water heating tank 24 upon energizing valve 158 to be distributed to the bottom of tank 24, thus insuring that the entering cold water will not mingle with the heated water at the top of the tank 24. The aperatures 162 are located at level L1 in tank 24 whereas the hot water outlet port 152 is located at level L2.

An electric immersion heater 164 is disposed within the tank 24 and supported from an insulating tank cover 166. The majority of the heating surface area of the heater 164 is disposed at the lower portion of the water heating tank 24.

The water heating tank includes six probes 173-178 disposed at levels L3-L8 respectively in FIG. 24 and supported by tank cover 166. Probes 173, 174 and 176 are the normal operation probes, whereas probes 175, 177 and 178 are safety control probes. Probe 173 is a low water level sensor at level L3 whereas probe 174 is a high water level sensor at level L4. Probe 175 is a thermistor probe for measuring an over temperature or under temperature conditions of the water at level L5 whereas probe 176 is also a thermistor probe for measuring and controlling the temperature of the water at level L6. Probes 177 and 178 are safety underfill and safety overfill water level sensors located at levels L7 and L8 respectively. The relative levels of the probes are shown as levels L1-L8 in FIG. 24.

Initially there is no water in water tank 24. When the electronic control 32 is energized, the low water level sensor 173 and the underfill sensor 177 each sense the absence of water and generate an electrical signal from control 32 to energize the third electrically operated valve 158 to initiate the flow of water from input conduit 156 to fill water tank 24. The cold water fills tank 24 until level L4 is reached, whereat the high water level sensor 174 generates a signal to control 32 to close valve 158.

The thermistor 176 senses the low water temperature at level L6 and generates an electrical signal to control 32 which initiates the flow of electricity through the immersion heater 164 to heat the water within the tank 24. When the water within the tank 24 is heated, hot water rises to the top of tank 24, and when hot water at approximately 200° F. is sensed by the thermistor 176 at level L6, an electrical signal is generated by thermistor 176 to inhibit the flow of electricity in the immersion heater 164.

The second electrically operated valve 154 controls the flow of hot water from the hot water outlet port 152 to the hot water inlet 66 of the mixer 64. The third electrically operated valve 158 controls the flow of cold water from a water input line 156 into the tank 24 via the supply port 150. A water flow regulator 180 compensates for variations in the water pressure at the location of the dispenser.

When the manually controlled switch 12 is activated, an electrical signal is generated that energizes the solenoid coil 54 in the first electrically operated valve to permit a flow of concentrate to the mixer 64, and simultaneously energizes the second electrically operated valve 154 to permit the flow of hot water at the desired temperature to the mixer 64 to mix with the concentrate. Since the first and second electrically operated valves 54 and 154 are energized simultaneously, the resultant beverage product from mixer 64 is of uniform strength regardless of the time of actuation of the first and second electrically operated valves 54 and 154.

As hot water is drawn from the water outlet 152 at level L2, the water flows from the tank 24, and the water level drops from L4 to L3. At level L3, the low water level sensor 173 senses the drop in water level and generates an electrical signal which initiates opening of the third electrically operated valve 158 to supply cold water to the tank via the supply port 150. The water level then rises again until level L4 is again reached. However, as the emptying and filling cycles progressively function, the level of cold water within the tank 24 rises until the lower thermistor 176 once again generates a signal that provides power to the immersion heater 164. It can be appreciated by those skilled in the art that by the control described hereinbefore, hot water is supplied to the mixer 64 at the desired temperature and that the temperature of the water within the tank is progressively controlled during the supply of hot water therefrom as well as when no water is being drawn from the tank 24.

In addition, the water temperature in tank 24 is stratified in relation to level in the tank 24 with the hottest water being disposed adjacent to the high water lever sensor 174.

The thermistor 175 senses a low water temperature condition and high water temperature condition at level L5 and generates an electrical signal to control 32 which may terminate dispensing under a low water temperature condition and terminate the flow of electricity to heater 164 upon a high water temperature condition.

Upon detection of an underfilled or overfilled condition by probes 177 or 178 located at levels L7 and L8 respectively, the operations of the machine 10 is terminated by control 32. The overflow pipe 153 also insures that excessive water will be removed in the event of a malfunction of the high water level sensor 174 and the overfill probe 178.

Refrigeration Compartment for the Receiption of the Concentrate Container

FIG. 24 also shows the location of the refrigeration compartment 22 having the metallic container 68 for receiving the concentrate container 36 and surrounded by insulation 69.

Figure 26:
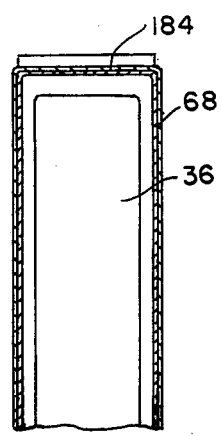
FIG. 26 is a sectional view taken on the line 26—26 of FIG. 24.

FIG. 26 is a sectional view along line 26—26 in FIG. 24 illustrating the metallic container 68 being surrounded by a U-shaped saddle 184 functioning as a thermal mass and in thermal contact with the metallic container 68 and a thermoelectric device 200 shown in FIGS. 27–31.

Figure 27:
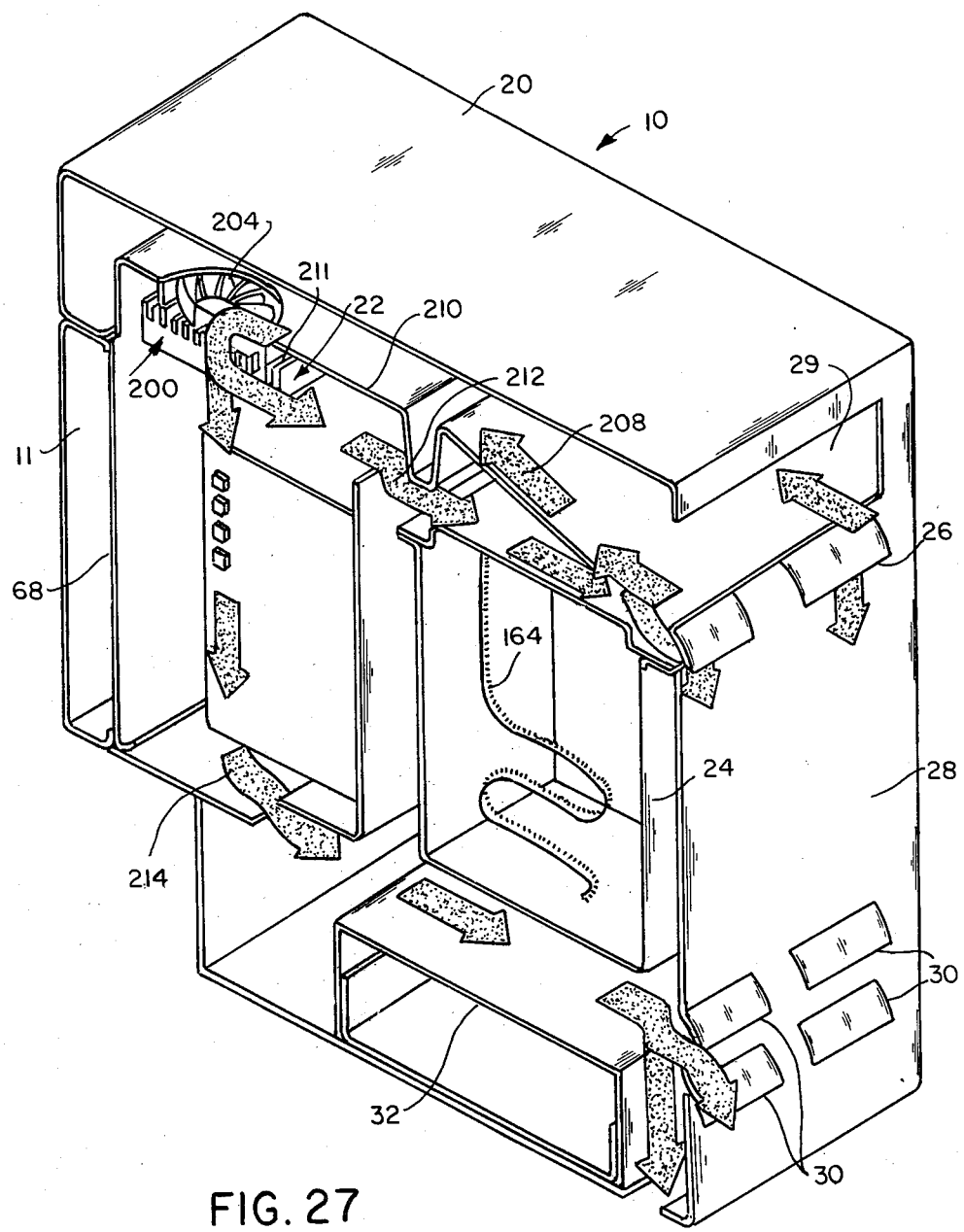
FIG. 27 is a perspective view of the air circulation internal the dispensing machine.

FIG. 27 is a perspective view of the refrigerated compartment 22. The refrigerated compartment 22 includes a thermo-electric device generally designated 200 and an electrically driven fan 204. Air at ambient temperature is drawn through the aperture 29 defined by the rear cover 28. This first current of air 208 represented by arrows, flows between the top cover 20 of the dispensing machine 10 and a divider plate 210. The first current of air 208 is impelled by the fan 204 to flow past the thermo-electric device 200 where the first current of air receives heat liberated from the hot side of heat sink 211 of the thermoelectric device 200. After passing through the thermoelectric device 200, the heated current of air 208 is divided into a second and a third current of air 212 and 214, respectively. The second current of air 212 passes over the top of the water heater tank 24 and exits to the outside of the machine 10 via the top set of louvres 26. The third current of air 214 passes between the water heater tank 24 and the electrical control 32 to exit from the machine 10 via the bottom set of louvres 30. The second and third heated currents of air 212 and 214 prevent condensation internal the machine 10.

Figure 28:
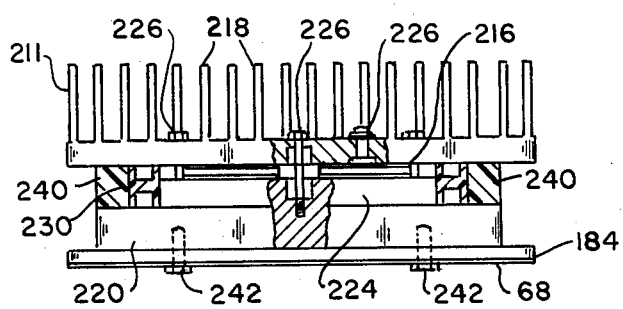
FIG. 28 is a side view partially in section of a thermo-electric cooling means.
Figure 31:
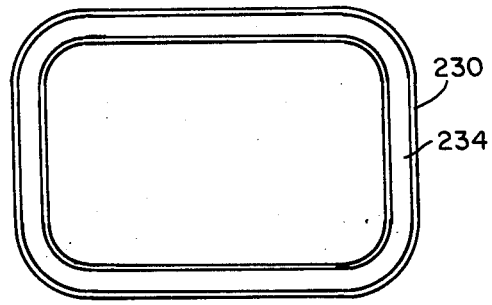
FIG. 31 is an enlarged top view of the sealing means shown in FIG. 30.

The thermoelectric device 200 is shown more particularly in FIGS. 27–31. FIG. 28 is a side view partially in section of a solid state thermoelectric heat pump device 216 connected to the heat sink 211 having a plurality of heat exchange fins 218 for dissipating heat generated at the hot side of the device 216. The cold side of the thermoelectric device 216 is connected to a cold sink 220.

Figure 29:
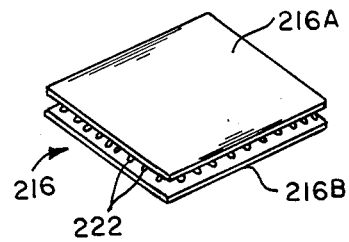
FIG. 29 is a perspective view of a thermoelectric cooler.

FIG. 29 is a perspective view of the solid state semiconductive thermoelectric heat pump 216 showing the hot side 216A and the cold side 216B, and the semiconductor material 222 disposed therebetween. The operation of the Peltier heat pump should be well known to those skilled in the art.

The heat pump 216 is in thermal contact with the heat sink 211 and the cold sink 220 through a heat conducting member 224. Screws 226 incorporating O-ring seals secure the heat pump 216 between the heat sink 211 and the cold sink 220. A moisture seal comprising a substantially H-shaped plastic member 230 shown more fully in FIGS. 30 and 31 receives a first and a second reusable continuous sealing gasket such as an O-ring or X-shaped O-ring 231 and 232 having cavities 234 and 236. The X-shaped O-rings provide a multiple seal at points 231A and 231B and 232A and 232B. A plastic insulator 240 encircles the moisture sealer 230. The cold sink 220 is connected to saddle 184 and compartment 68 by fastener 242 to provide thermal contact to the refrigerated compartment 68.

Figure 32:
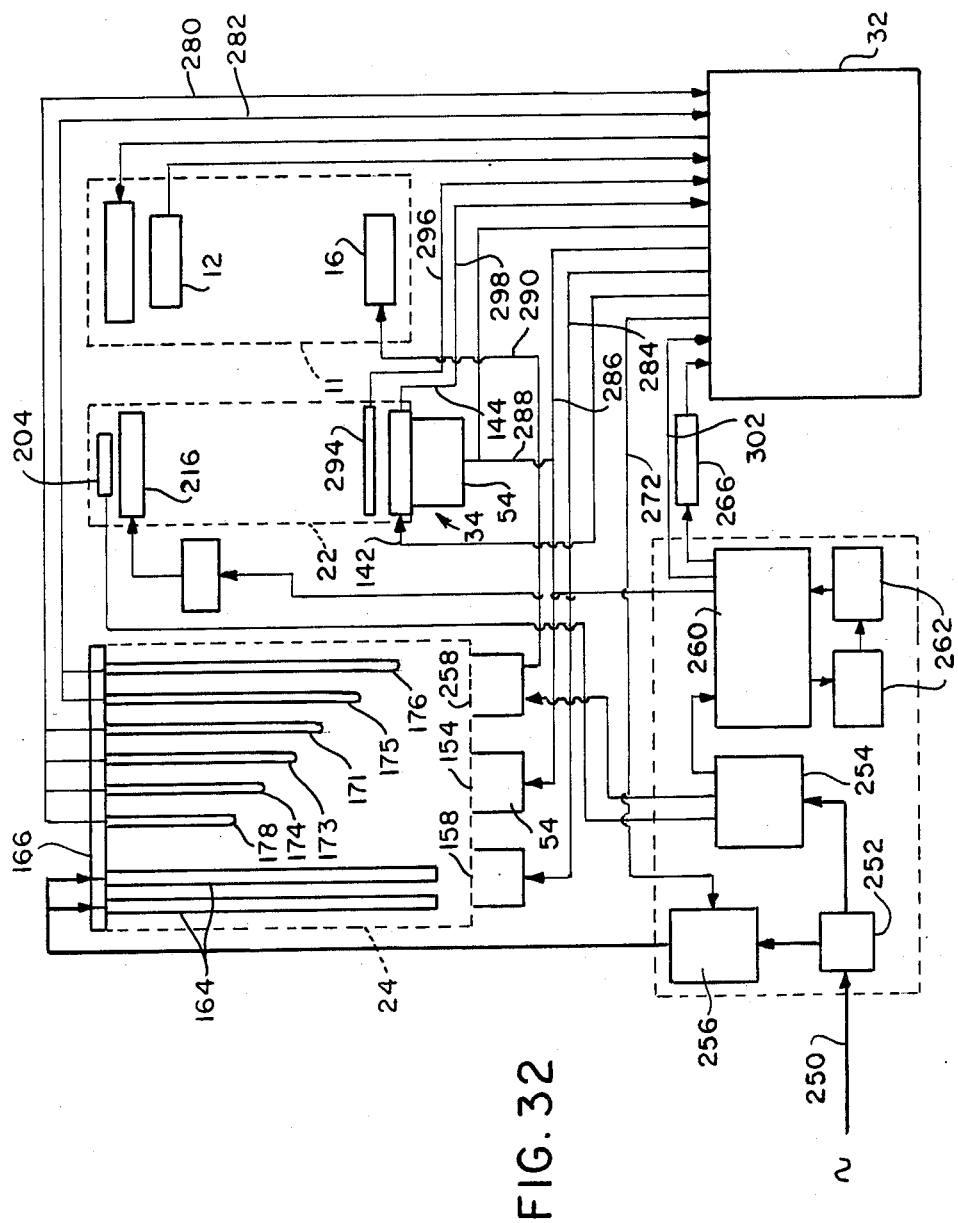
FIG. 32 is a block diagram of the electrical control means of the dispensing machine.

It is well known that Peltier heat pumps are extremely sensitive to moisture. Accordingly, many in the prior art have used permanent moisture seals for Peltier solid state heat pumps. Unfortunately, these permenantly sealed heat pumps are not repairable. The present moisture seal allows the disassembly of the unit for repair, inspection or maintenance while maintaining a proper moisture seal for the heat pump 216. The present moisture seal has been found to be extremely efficient in preventing moisture from degrading the heat pump. It should be appreciated that the present seal may be incorporated in other devices utilizing Peltier heat pumps.
Electrical Control Circuitry FIG. 32 is a block diagram of the electrical power and control system 32. Alternating current power is introduced on a line 250 to a terminal block 252 which distributes power to a power transformer 254 and provides power to fan 204. In addition, power transformer 254 powers a hot water solenoid valve 258 for dispensing hot water only through spout 18 upon actuation of manual switch 16. The power transformer also furnishes low voltage power to a low voltage power supply 260. Appropriate filters 262 are incorporated within the low voltage power supply 260 for furnishing power to a logic printed circuit board in the electronic control 32. A night switch 266 enables termination of normal operation of the unit while maintaining the water at an elevated temperature and keeping the concentrate properly refrigerated.

The electronic control 32 provides the various functions and logic to control the components as heretofore set forth. Probes 173, 174, 177 and 178 are connected by line 280 to the control 32. Thermistors 175 and 176 are connected by line 282 to the electronic control 32. The electronic control operates the cold water inlet solenoid 158 on line 284.

The coffee solenoid valve 154 is energized by control 32 on line 286 upon manual actuation of switch 14. Concommitantly therewith, control 32 energizes the concentrate dispense solenoid coil 54 on line 288. Accordingly, in this embodiment the first and second electrically operated valves 54 and 154 are simultaneously opened and closed. The hot water solenoid 258 is energized on line 290 upon manual activation of switch 16. The heater 164 is controlled by control 32 on line 292 through the heater contactor 256, whereas the thermoelectric heat pump is controlled in accordance with the output of a refrigeration thermistor 294 connected by line 296 to control 32. Photodetector 144 is likewise coupled to control 32 on line 298.

The circuit diagram also includes various safety interlocks which are readily apparent from the block diagram. It should be appreciated by those skilled in the art that the block diagram as shown in FIG. 32 may be achieved by various specific circuit design and, accordingly, only the interrelation between the various components is shown in the block diagram is set forth. Those skilled in the art should be able to achieve the desired result, combination and interrelation of component operation by reference to FIG. 32.

Figure 33:
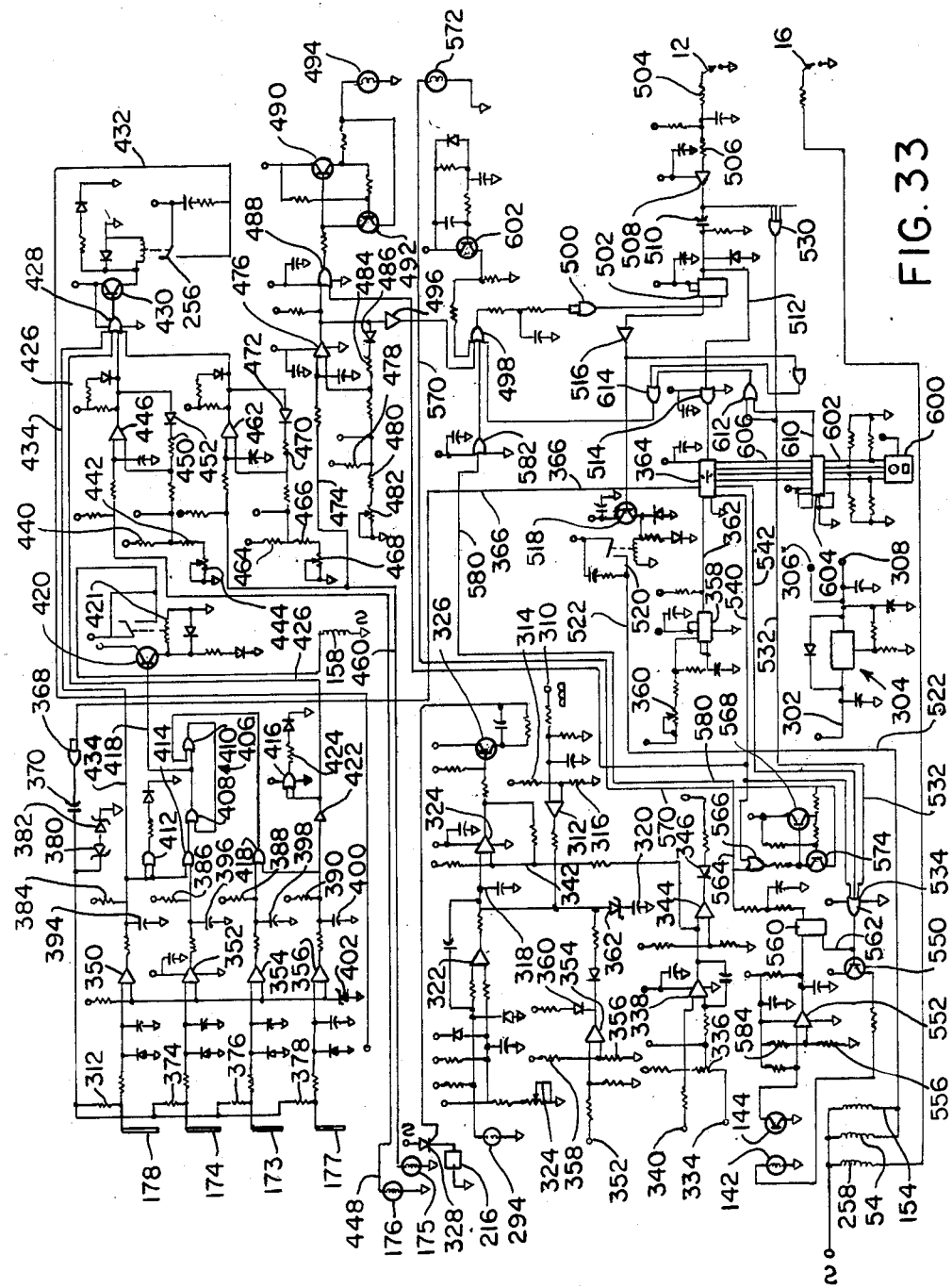
FIG. 33 is a schematic diagram of the electrical control means shown in FIG. 32.

FIG. 33 is a schematic diagram showing a specific and detailed arrangement of the electronic control 32 as heretofore described. The operation of the various components in the circuit should be well known to those skilled in the art. The low voltage power supply 260 is connected by a line 302 to a voltage regulator 304 and associated filters for producing an operating voltage on the outputs 306 and 308.

The control for the thermoelectric device 216 and associated circuitry is located at the lower left portion of the diagram. A rectified sine wave on line 310 is directed to a comparator 312 with the other input of comparator 312 being fixed by a voltage divider network comprising resistors 314 and 316. The output of comparator 312 will have a low logic condition during each cycle of the rectified sine wave to discharge capacitor 318. Capacitor 318 is the main timing capacitor for triggering a thyristor circuit to power the heat pump 216. Capacitor 318 is normally charged in accordance with the current flowing through thermistor 294, which is applied to the negative input of amplifier 322. Potentiometer 324 provides a temperature adjustment for determining the proper operational temperature of the refrigerated compartment 22. As the temperature within the refrigerated compartment decreases, the resistance of thermistor 294 increases and, accordingly, operational amplifier decreases the amount of charge on capacitor 318. Conversely, when the temperature of the refrigerated compartment 22 is higher than the proper operating temperature, the resistance of thermistor 294 is low, thereby enabling amplifier 322 to produce a greater charge on capacitor 318 for each half cycle applied on line 310. When the voltage on capacitor 318 exceeds the voltage on the positive input of comparator 324, the output of comparator 324 triggers transistor 326 to fire thyristor 328 to power heat pump 216.

A current reference is applied to an input 334 connected to a current limit adjustment potentiometer 336, the output thereof being applied to an operational amplifier 338. The current through thermoelectric device 216 is sensed by an appropriate current sensing device and is applied to input 340 connected to operational amplifier 338. The output of operational amplifier 338 is applied on line 342 to the positive of comparator 324 to vary the firing of thyristor 328 in accordance with the current flow therethrough. If the current flow through thyristor 328 is in excess of a desired value, the excess current will increase the level of input 340, which will be compared to the reference value on line 334. Operational amplifier 338 will vary the voltage on the positive input of comparator 324 to reduce the portion of each of half cycle in which there is conduction through thyristor 328.

Amplifier 344 drives a light-emitting diode 346 to indicate a current limiting condition. The output of operational amplifier 338 controls the threshold at which comparator 324 will trigger transistor 326 to fire thyristor 328. Comparator 322 controls the rate at which capacitor 318 is charged, whereas the output of operational amplifier 338 varies the threshold at which comparator 324 will trigger transistor 326 to fire thyristor 328. This enables the current limited operation of amplifier 338 to override the demand required by comparator 322. A voltage-sensing circuit sensing the voltage on heat pump 216. The voltage level is applied to terminal 352, which terminal is connected to the negative input of comparator 354 with the positive input thereof connected to a voltage divider comprising resistors 356 and 358. Upon comparator 354 sensing a voltage in excess of the reference voltage, the output of comparator 354 will have a low logic level, thus inhibiting the charging of capacitor 318 and preventing further firing of thyristor 328. Light-emitting diode 360 indicates an excessive voltage condition on heat pump 216. Zener diode 362 coupled with capacitor 320 reduce the rate at which capacitor 318 is charged to provide a more suitable current for the heat pump 216. When the voltage on comparator 322 exceeds the breakdown voltage of the Zener diode 362, capacitor 320 is connected in parallel to capacitor 318, thus reducing the rise in voltage on capacitor 318. Preferably, capacitor 320 is of a larger value than capacitor 318.

The present control for the thermoelectric device 216 has three distinct advantages over the prior art. First, the control limits the maximum current to the thermoelectric device 216. Second, the control limits the maximum voltage applied to the thermoelectric device 216. Third, the control furnishes the power to the thermoelectric device during each half cycle of line voltage as opposed to intermittent operation thus elimination the possibility of moisture accumulating on the thermoelectric device 216.

The water level sensing controls are shown in the upper left portion of the diagram with sensors 178, 174, 173 and 177 being respectively connected to comparators 350, 352, 354 and 356. Each of the electrodes 178, 174, 173 and 177 are stainless steel electrodes and receive an alternating current signal to prevent electrolysis in the water tank 24. The alternating current signal is generated by a clock generator 358 located in the bottom central portion of the diagram with potentiometer 360 controlling the pulse rate of the clock 358. The output of clock 358 is applied on line 362 to a divider 364. The divided pulses are applied on line 366 through buffer 368, and capacitor 370 to resistors 372, 374, 376 and 378 to the probes 178, 174, 173 and 177. Zener diodes and 382 insure a symmetrical voltage to eliminate electrolysis of the probes 178, 174, 173 and 177. Resistors 384, 386, 388 and 390 normally charge capacitors 394, 396, 398 and 400. Zener diode 402 establishes the threshold of comparators 350, 352, 354 and 356.

In the event that any of the probes 178, 174, 173 or 177 are not in contact with the water in the water heating tank which is grounded, the output of the respective comparators 350, 352, 354 and 356 will be low, thus inhibiting the charging of the respective one of capacitors 394, 396, 398 and 400. A latch gate generally designated 406 comprises gates 408, 410, 412 and 414, interconnected with comparators 350, 352, 354 and 356. If either the fill probe 173 or the underfill probe 177 is remote from the water, the output of comparators 354 or 356 will be low, thus producing a high output from gate 416 to produce a high output on line 418 to fire transistor 420 to operate a relay 421 to open the third electrical control valve 158 and provide water through cold port 150. The underfill probe 177 includes an additional function through amplifier 422 to illuminate a light-emitting diode 424 to warn of an underfill condition and, concomitantly to apply a high logic signal on line 426, to NOR/gate 428 to deactivate transistor 430, and open relay 256 which controls power on line 432 to the heater 164. As the water covers the underfill probe 177, the probe is shorted to ground and comparator 356 will provide a high output. However, the fill probe 173 will still produce a high output on gate 416 to continue filling the tank 24 with water.

As the water continues to increase and contacts the full probe 174, comparator 352 produces a high logic output to change the status of latch 406 with the output on line 418 changing to a low logic state. This terminates conduction of transistors 420 and closes the third electrically-operated valve 158. In the event that the water input is not terminated by the shorting of probe 174, the overfill probe 178 will contact the water and again change the status of the output of line 418 to terminate conduction of transistor 420 and close third electrically-operated valve 158. In addition thereto, the high output of comparator 350 is applied on line 426 to gate 428 to terminate operation of the heater 164 in a manner similar to the operation of the underfill probe 177.

The heater control as set forth in the upper right corner of the schematic diagram. A voltage divider network comprising resistors 440 and 442 and potentiometer 444 is applied to the noninverting input of comparator 446. The value of potentiometer 444 determines the desired water temperature in the water heating tank 24. The thermistor 176 is connected by a line 448 to the negative input of comparator 446. Resistor 450 and diode 452 provide proper hysteresis for comparator 446. As the temperature of the water rises in the water heating tank 24, the resistance of thermistor 176 decreases, and the negative input of comparator 446 drops below the reference level on the positive input thereof, thus producing a high logic output to gate 428 to terminate power to transistor 430 and thereby terminate electric power to the heater 164. Over temperature probe comprising thermistor 175 is similarly connected by line 460 to the negative input of a comparator 462. The positive input of comparator 462 is derived from a voltage divider comprising resistors 464, 466 and potentiometer 468. Resistor 470 and diode 472 provide the proper hysteresis for comparator 462. The output of comparator 462 operates in a manner similar to comparator 446 to terminate conduction of transistor 430 and terminate power to heater upon the thermistor 175 detecting a temperature greater than the desired temperature as established by potentiometer 468. Thermistor 175 is redundant to thermistor 176 but also insures against insufficient and excessive water temperature.

Typically, the temperature setting of potentiometer 468 is established several degrees above the temperature established for thermistor 444 to ensure that the thermistor 176 controls the proper operating temperature of the machine. Line 460 is connected to line 474 to a comparator 476. The positive input of comparator 476 is determined by a voltage divider comprising resistors 478 and 480, and potentiometer 482. Potentiometer 468 determines the over temperature condition through comparator 462, whereas potentiometer 482 determines the under temperature condition through comparator 476. In a manner similar to that heretofore described, resistor 484 and diode 486 provide the proper hysteresis for comparator 476. Upon thermistor 177 detecting a temperature lower than the temperature desired by potentiometer 482, a low logic level will be produced at the output of comparator 476 to produce a high voltage output on gate 488 to energize transistor 490 to illuminate a cold warning lamp 494. A one pulse per second signal from divider 364 to gate 488 causes lamp 494 to flash to indicate a low temperature. Transistor 492 provides short circuit protection for the circuit of lamp 494. In addition, the low output from comparator 476 is directed through a inverter 496 to NOR gate 498. The output of NOR gate 498 is applied to gate 500 to set flip-flop and thus inhibit dispensing of concentrate and hot water upon detection of a temperature lower than the desired temperature as will become apparent from the explanation hereinafter.

The mechanical dispensing switch 12 is connected through resistors 504 and 506 and inverter 508 to the reset input of flip-flop 502. Capacitor 510 compacitively couples the switch 12 to flip-flop 502 to provide a momentary pulse to be applied to the reset input of flip-flop 502 upon the closing of switch 12. Concomitantly therewith, the momentary pulse from closing switch 12 is applied on line 512 through gate 514 to reset divider 364. The output of flip-flop 502 is connected through inverter 516 to transistor 518 to control relay 520. Relay 520 provides power on line 522 to the first and second electrically operated valves 54 and 154. In addition thereto, the closure of switch 12 causes a signal to be applied to gate 530 which is transferred on line 532 to NOR gate 534. Divider 364 generates a one pulse per second signal on line 540 in addition to generating a one pulse per two second signal on line 542 which are applied to NOR gate 534. Accordingly, transistor 550 is energized every two seconds upon the closure of switch 12. The output of transistor 550 powers concentrate lamp 142 to impinge upon phototransistors 144 in the event that concentrate is not present within the receptacle 44. The output of phototransistor 144 is applied to amplifier 552 having a voltage divider at the non-inverting input comprising resistors 554 and 556. The output of amplifier 552 is applied to the set input of flip-flop 560. The output of NOR gate 534 is also connected by line 562 to the reset input of flip-flop 560. The output of flip-flop 560 is applied on line 564 to gate 566 to energize transistor 568. The output of transistor 568 is connected by line 570 to illuminate lamp 572 to indicate the absence of concentrate within the receptacle 40. The one pulse per second signal from divider 364 on line 540 is also applied to gate 566 causing a blinking of light of 472. Transistor 574 is a short circuit protection for the circuit.

The output of flip-flop 560 on line 564 is also connected on line 580 to gate 582 which is connected to NOR gate 498 to inhibit dispensing of concentrate and hot water by applying a high input to the set input of flip-flop 502 through gate 500. Accordingly, if switch 12 is closed and concentrate is below line 146 in the receptacle 44, then the light emanating from lamp 142 will impinge on phototransistor 144 and flip-flop 502 will be set to inhibit the dispensing of concentrate and hot water.

Similarly, if hot water is not present in water tank 24, comparator 476 will similarly set flip-flop 502 in inhibit the dispensing of concentrate and hot water. If concentrate is present within the receptacle 44 and hot water is present in tank 24, then light emanating from lamp 142 will not impinge upon phototransistor 144 and flip-flop 142 will not be set and the control will energize transistor 518 to enable dispensing of concentrate and hot water.

A digital switch 600 is connected through a plurality of lines 602 to a digital comparator 604 for comparing the valve on lines 602 with a binary digital value on lines 606 from divider 364. The digital switch 600 may be set for a single or a plurality of cups to be dispensed by a single closure of switch 12. The size of each cup referred to by the digital switch 600 is controlled by potentiometer 360.

Upon closing switch 12, transistor 518 is energized and divider 364 is reset. The comparator 604 compares the digital signals between the number of cups desired, for example one cup as set in digital switch 600 and the binary digital value generated during the dispensing on lines 600 by divider 364. Upon obtaining an equal binary valve from divider 364 and digital switch 600, a high output is produced on line 610 to gate 612 and 614 to provide a high input to NOR gate 498 and thus a set flip-flop 502 through gate 500 to terminate dispensing of coffee and concentrate. Upon reclosing switch 12, the process will again be repeated. If digital switch 600 is changed to 10 for example, the dispenser will accurately dispense for a 10 cup carafe by a single closure of switch 12. Lamp 14 is illuminated at the beginning of dispensing of each cup. If the concentrate level falls below line 146 during the dispensing of a 10 cup carafe, then the control will terminate operation after dispensing a whole number of cups of proper concentration and will illuminate light 572. Switch 16 is directly connected to a hot water solenoid valve 258 to dispense water only through nozzle 18.

Transistor 620 and the associated circuits connected to gate 498 sets flip-flop 502 upon initial power to the dispensing unit. Accordingly, the dispensing of coffee and concentrate will occur only if certain conditions in the circuit are present, namely (1) proper water temperature and (2) proper concentrate level.

As heretofore described, the present invention is incorporated into a hot beverage dispensing machine having a novel concentrate dispenser, a novel water heating tank, as well as a novel thermal electric refrigeration unit and seals for refrigerating the concentrate. In addition, the electronic control is heretofore described, provides a complete and through control of the operation of the hot beverage dispensing machine, making the machine suitable for use by non-skilled employees.

What is claimed is:

1. A beverage dispensing machine comprising in combination:
   a beverage concentrate container;
   a refrigerated compartment for the reception of said concentrate container;
   a first valve associated with said container, said first valve permitting the flow of said concentrate from said container when said container is located within said refrigerated compartment;
   said first valve including a cap which cooperates with an opening defined by said container;
   a passageway defined by said cap;
   a valve seat disposed adjacent a first end of said passageway;
   a flexible perforate diaphragm secured adjacent the periphery thereof between said container and said cap;
   a closure disposed integrally with said diaphragm, said closure cooperating with said valve seat; and
   a valve actuator extending through said passageway enabling said closure to be lifted from said valve seat upon axial movement of said first valve actuator to permit flow of concentrate from said container to said passageway;
   a receptacle removably receiving said first valve;
   a receptacle output disposed adjacent said receptacle;
   a first electrically controlled valve for controlling the flow of said concentrate from said receptacle output;
   a water tank for containing water;
   a water inlet in fluid communication with said tank and said mixer;
   a second electrically controlled valve for controlling the flow of water to said mixer to effect mixing of said concentrate and said water within said mixer; and
   a dispenser spout disposed in fluid communication with said mixer, said spout being disposed remote from said inlet and said receptacle output.

2. A beverage dispensing machine as set forth in claim 1 wherein said valve actuator is a rod, a first end of said rod being secured within said closure, said rod being slidably supported within said passageway by a spider disposed within said passageway.

3. A beverage dispensing machine as set forth in claim 1 wherein said first and second electrically controlled valve operate in unison with one another.

4. A beverage dispensing machine as set forth in claim 1 including electrical control means for controlling the functions of said first and second electrically controlled valves.

5. A beverage dispensing machine as set forth in claim 1 wherein said receptacle includes an open top for removably receiving said cap, said receptacle further including a base which cooperates with a second end of said valve actuator to move said valve actuator axially.

6. A beverage dispensing machine as set forth in claim 5 wherein said base slopes downwardly towards said receptacle output, enabling said concentrate disposed within said receptacle to flow towards said receptacle output.

7. A beverage dispensing machine as set forth in claim 1 wherein said diaphragm further includes an annular web extending between said closure and said periphery, said web causing partial rotation of said closure relative to said valve seat upon said axial movement of said first valve actuator.

8. A beverage dispensing machine as set forth in claim 7 wherein said annular web includes a plurality of segments, each segment including a first and second end, said first ends of said segments being connected to said closure, said second ends of said segments being connected to said periphery, said segments, periphery and closure defining a plurality of perforations therebetween.

9. A beverage dispensing machine as set forth in claim 8 wherein each one of said plurality of perforations is of substantially Z-shaped configuration.

10. A hot beverage dispensing machine as set forth in claim 1 wherein said receptacle output defines a conduit and said first electrically controlled valve being disposed in said conduit.

11. A beverage dispensing machine as set forth in claim 10 wherein said first electrically controlled valve includes a solenoid coil and a solenoid core, said solenoid core being disposed adjacent a valve seat when said coil is de-energized, said core moving axially away from said valve seat upon energization of said coil.

12. A beverage dispensing machine as set forth in claim 11 wherein said conduit is of circular cross section and said solenoid core includes a central portion of cylindrical configuration and opposed ends of conical configuration.

13. A beverage dispensing machine as set forth in claim 12 wherein one of said conical ends cooperates with said valve seat.

14. A beverage dispensing machine as set forth in claim 13 wherein said solenoid core includes a longitudinal slot on the outer surface thereof, said slot extending between said conical ends.

15. A beverage dispensing machine as set forth in claim 14 wherein said valve seat is disposed adjacent one end of a bore defined by a conical resilient portion, said resilient portion including a resilient skirt which receivably engages a second end of said conduit.

16. A hot beverage dispensing machine comprising in combination:
   a beverage concentrate container;
   a refrigerated compartment for the reception of said concentrate container;
   said refrigerated compartment includes thermoelectric cooling means disposed adjacent said refrigerated compartment for reducing the temperature within said refrigerating compartment;
   said thermoelectric device comprising a solid state thermoelectric cooler;

a hot sink and a cold sink disposed in contact with the sides of said solid state thermoelectric cooler;

a disassembleable seal means interconnecting said heat sink and said cold sink for preventing moisture permeation to said solid state thermoelectric cooler;

said seal means including a substantially H-shaped rigid member having a low thermoconductivity property defining a first and a second groove thereby;

a reusable continuous sealing gasket disposed in each of said first and second grooves of said H-shaped member for providing a seal at each of said continuous sealing gaskets;

a first valve associated with said container, said first valve permitting the flow of said concentrate from said container when said container is located within said refrigerated compartment;

a receptacle removably receiving said first valve;

a receptacle output disposed adjacent said receptacle;

a first electrically controlled valve for controlling the flow of said concentrate from said receptacle output;

a mixer for receiving said concentrate from said receptacle output;

a water heater tank for container hot water;

a hot water inlet in fluid communication with said tank and said mixer;

a second electrically controlled valve for controlling the flow of hot water to said mixer to effect mixing of said concentrate and said hot water within said mixer; and a dispenser spout disposed in fluid communication with said mixer, said spout being disposed remote from said inlet and said receptacle output.

17. A hot beverage dispensing machine as set forth in claim 16 wherein said continuous sealing gasket includes an O-ring disposed in each of said first and second grooves of said H-shaped member for providing a seal at the terminations of said O-ring.

18. A hot beverage dispensing machine as set forth in claim 17 wherein said continuous sealing gasket includes a substantially X-shaped O-ring disposed in each of said first and second grooves of said H-shaped member for providing a seal at each of the terminations of said X-shaped O-ring.

19. A dissassembable seal for a solid state thermoelectric cooler having a hot sink and a cold sink disposed in contact with the sides of said solid state thermoelectric cooler; the improvement comprising in combination:

a substantially H-shaped rigid member having a low thermoconductivity defining a first and a second groove thereby;

said H-shaped rigid member being disposed between the hot sink and the cold sink and encompassing the solid state thermoelectric cooler, and;

a first and second reusable continuous sealing gasket respectively disposed in said first and second grooves for providing a seal between said H-shaped rigid member and the heat sink and the cold sink.

20. The seal of claim 19 wherein said continuous sealing gasket includes an O-ring disposed in each of said first and second grooves of said H-shaped member for providing a seal between said H-shaped rigid member and said heat sink and said cold sink.

21. The seal of claim 20 wherein said O-ring includes a substantially X-shaped O-ring disposed in each of said first and second grooves of said H-shaped member for providing a seal at each of the terminations of said X-shaped O-ring.

22. A concentrate dispenser for dispensing a concentrate, comprising in combination:

a concentrate container for holding the concentrate;

a receptacle for removably receiving said concentrate container;

said receptacle having a receptacle output;

a first valve associated with said container;

said first valve permitting the flow of the concentrate from said container when said container is located within said receptacle;

a first electrically controlled valve for controlling the flow of the concentrate from said receptacle output;

said first valve including a cap which cooperates with an opening defined by said container;

a passageway defined by said cap;

a valve seat disposed adjacent a first end of said passageway;

a flexible perforate diaphragm secured adjacent the periphery thereof between said container and said cap;

a closure disposed integrally with said diaphragm, said closure cooperating with said valve seat; and a valve actuator extending through said passageway enabling said closure to be lifted from said valve seat upon axial movement of said first valve actuator to permit flow of concentrate from container to said passageway.

23. A concentrate dispenser as set forth in claim 22 wherein said valve actuator is a rod, a first end of said rod being secured within said closure, said rod being slidably supported within said passageway by a spider disposed within said passageway.

24. A concentrate dispenser as set forth in claim 22 wherein said receptacle output defines a conduit and said first electrically controlled valve being disposed in said conduit.

25. A concentrate dispenser as set forth in claim 22 wherein said receptacle includes an open top for removably receiving said cap, said receptacle further including a base which cooperates with a second end of said valve actuator to move said valve actuator axially.

26. A concentrate dispenser as set forth in claim 25 wherein said base slopes downwardly towards said receptacle output, enabling said concentrate disposed within said receptacle to flow towards said receptacle output.

27. A concentrate dispenser as set forth in claim 22 wherein said diaphragm further includes an annular web extending between said closure and said periphery, said web causing partial rotation of said closure relative to said valve seat upon said axial movement of said first valve actuator.

28. A concentrate dispenser as set forth in claim 27 wherein said annular web includes a plurality of segments, each segment including a first and second end, said first ends of said segments being connected to said closure, said second ends of said segments being connected to said periphery, said segments, periphery and closure defining a plurality of perforations therebetween.

29. A concentrate dispenser as set forth in claim 28 wherein each one of said plurality of perforations is of substantially Z-shaped configuration.

30. A beverage dispensing machine for dispensing a beverage from a concentrate; comprising in combination:

a concentrate container for receiving the concentrate;

a cap having a passageway for cooperating with an opening defined by said container;

said passageway having a first end disposed adjacent said cap and a second end disposed remote from said cap;

a receptacle removably receiving said passageway of said cap;

a first valve associated with said container;

said first valve permitting the flow of the concentrate by action of gravity from said container through said passageway to exit from said second end to fill said receptacle to a substantially constant level adjacent said second end of said passageway;

a receptacle output disposed adjacent said receptacle;

a first electrically controlled valve for controlling the flow of the concentrate from said receptacle output;

said receptacle output further including a resilient tip having a particular metering orifice diameter for accurately dispensing a precise amount of concentrate from said receptacle output;

said tip being removeably attached in a fluid tight manner to said receptacle output to enable said tip to be interchanged with another tip of a different metering orifice diameter;

a water tank;

said water tank including a water output conduit established vertically within said water tank and extending to a first level;

a mixer for receiving the concentrate from said receptacle output and for receiving water from said output conduit of said water tank;

a second electrically controlled valve for controlling the flow of the water from said water tank to said mixer to effect mixing of the concentrate with the water within said mixer;

a water inlet in fluid communication with said water tank;

a first water level sensor, disposed in said water tank and connected to a third electrical control valve for controlling the input of water into said water tank, that establishes the level of water in said water tank at a second level;

a second water level sensor, disposed in said water tank and connected to said third electrical control valve for controlling the input of water into said water tank, that establishes the level of water in said water tank at a third level;

said third level being established at a higher level than said second level and said second level being established at a higher level than said first level for enabling the water to flow by action of gravity into said water output conduit from a substantially constant water level; and a dispenser spout disposed in fluid communication with said mixer, said spout being disposed remote from said inlet and said receptacle output.

* * * * *